United States Patent [19]

Ediger et al.

[11] Patent Number: 4,788,725

[45] Date of Patent: Dec. 6, 1988

[54] SPA WITH SLIDE VALVE

[75] Inventors: Melvin C. Ediger, Dallas; R. M. S. Fox, Estacada, both of Oreg.

[73] Assignee: Marquis Corp., Independence, Oreg.

[21] Appl. No.: 14,698

[22] Filed: Feb. 12, 1987

[51] Int. Cl.[4] ........................ F16K 15/00; A61H 33/02

[52] U.S. Cl. .......................................... 4/542; 251/205

[58] Field of Search .................... 4/541, 542, 543, 544, 4/492; 128/66; 200/311, 313; 251/205, 206, 83, 121

[56] References Cited

U.S. PATENT DOCUMENTS

| | | | |
|---|---|---|---|
| 1,052,051 | 2/1913 | Grimes . | |
| 1,401,097 | 12/1921 | Nickolaus | 251/205 X |
| 1,470,460 | 10/1923 | Lorraine et al. | 251/205 X |
| 1,527,927 | 2/1925 | Schroder . | |
| 2,738,948 | 3/1956 | Barnes . | |
| 2,764,995 | 10/1956 | Krupp et al. | 251/205 X |
| 2,980,392 | 4/1961 | Greenwood . | |
| 3,441,957 | 4/1969 | Friedman | 362/32 |
| 3,874,374 | 4/1975 | Jacuzzi | 128/66 |
| 3,974,853 | 8/1976 | Bentley . | |
| 4,637,080 | 1/1987 | Hutchinson | 128/66 X |

FOREIGN PATENT DOCUMENTS

| | | | |
|---|---|---|---|
| 3319914 | 1/1983 | Fed. Rep. of Germany . | |
| 2178826 | 2/1987 | United Kingdom | 4/492 |

*Primary Examiner*—Daniel P. Stodola

*Attorney, Agent, or Firm*—Kolisch, Hartwell & Dickinson

[57] ABSTRACT

A spa with a slide valve controlling the admission of air to an air and water mixer in the spa. The slide valve has a closure element slidably mounted within a cylindrical valve chamber of a valve housing, and an air admission slot in the valve housing. Movement of the closure element changes the extent of the slot which communicates with an end of the valve chamber and through this end with a water and air mixer.

8 Claims, 2 Drawing Sheets

SPA WITH SLIDE VALVE

BACKGROUND AND SUMMARY OF THE INVENTION

This invention relates to a spa, and to a so-called slide valve usable in controlling the admission of air into a circulated stream of liquid such as the water which is contained in a spa.

A conventional spa includes a tub portion which holds the water in the spa, and various electrically powered instrumentalities that are selectively controlled by a user to change the operating conditions of the spa. Among such instrumentalities may be a pump, which has its intake withdrawing water from the tub portion of the spa and its discharge connecting through a conduit to the tub of the spa with the pump being operated to produce water circulation. It is common practice to provide this conduit with a venturi-type of device which pulls air from the atmosphere into the stream of water being circulated, with such water and air then being ejected through a hydro jet into the tub portion of the spa.

To control the amount of air which is drawn into the circulated water, a valve is usually provided adjustable between loosed and open positions and which is operable upon adjustments made therein to shut off air flow or to permit various rates of air flow into the circulated water. Valves presently known have not been entirely satisfactory, such commonly being a rotary type of valve which does not clearly indicate its adjusted state and which is difficult to adjust to produce fine control of the flow rate of air introduced.

One object of this invention is to provide a spa which includes a slide valve for controlling air flow to the circulated water which may include an actuator movable along a path for adjusting the valve between a closed and various degrees of openness in position. The condition of the valve is readily observable, and accurate and fine control of the amount of air introduced is permitted.

Another object is to provide a spa with slide valve for controlling air flow where the valve has a construction such that for a given amount of movement in a closure element of the valve, the amount that the valve is opened increases as the closure element is moved progressively from a fully closed position.

A further object is to provide in such combination, a slide valve which includes a check valve which opens to permit air flow as drawn by a vacuum inwardly and through the valve but which closes to prevent a reverse flow of fluid through the valve.

In a specific and preferred embodiment of the invention, the slide valve includes a valve housing which has a cylindrical chamber extending along the interior thereof and a valve closure element reciprocally mounted within this chamber slidable along the length of the chamber. An elongate air admission slot in the housing extends along the length of this chamber which opens the chamber to the atmosphere. Movement of the closure element along this chamber varies the extent of the slot which connects with one end of the chamber, and a water and air mixer connected to this one end of the chamber. The closure element may be directly linked through a plunger connected therewith with an adjustment knob which the user utilizes in adjusting the position of the closure element. In the context of a spa, such adjustment knob may be presented on the exterior side of a control panel which is mounted in a convenient position adjacent the tub portion of the spa.

Further contemplated as an object of the invention is the provision of a novel slide valve for controlling air flow which is readily assembled from prefabricated parts and readily installed in an assembled state in an operative position, such as one controlling the admission of air into spa circulated water. The valve requires minimal maintenance, is economically produced, and is relatively easily repaired should such be necessary.

These and other objects and advantages are obtained by the invention, which is described hereinbelow in conjunction with the accompanying drawings, wherein:

FIG. 2 is a view taken generally along the line 3—3 in FIG. 1, on a larger scale, illustrating details of a slide valve which is provided in the spa for controlling the admission of air into water circulated in the spa;

Figure 1:
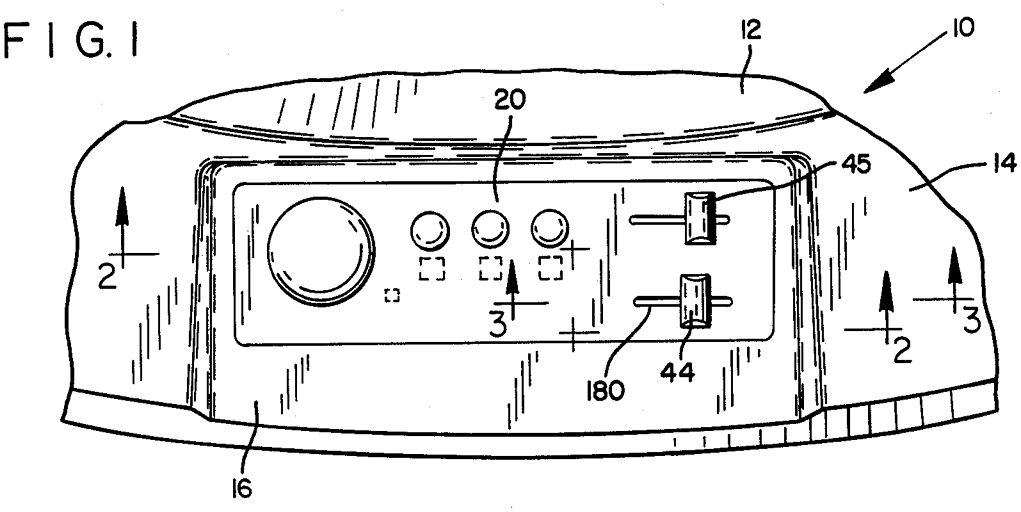
FIG. 1 is a top plan view of portions of a spa, looking downwardly at a control panel in the spa.

Referring now to the drawings, and first of all, more particularly to FIG. 1, a spa is indicated generally at 10 which includes a tub portion partially shown at 12 which holds the water of the spa. A rim in the spa which extends about the tub portion is partially shown at 14. Recessed downwardly from the general level of the rim is a subplatform area 16 on which is suitably mounted a control panel shown at 20.

Figure 2:
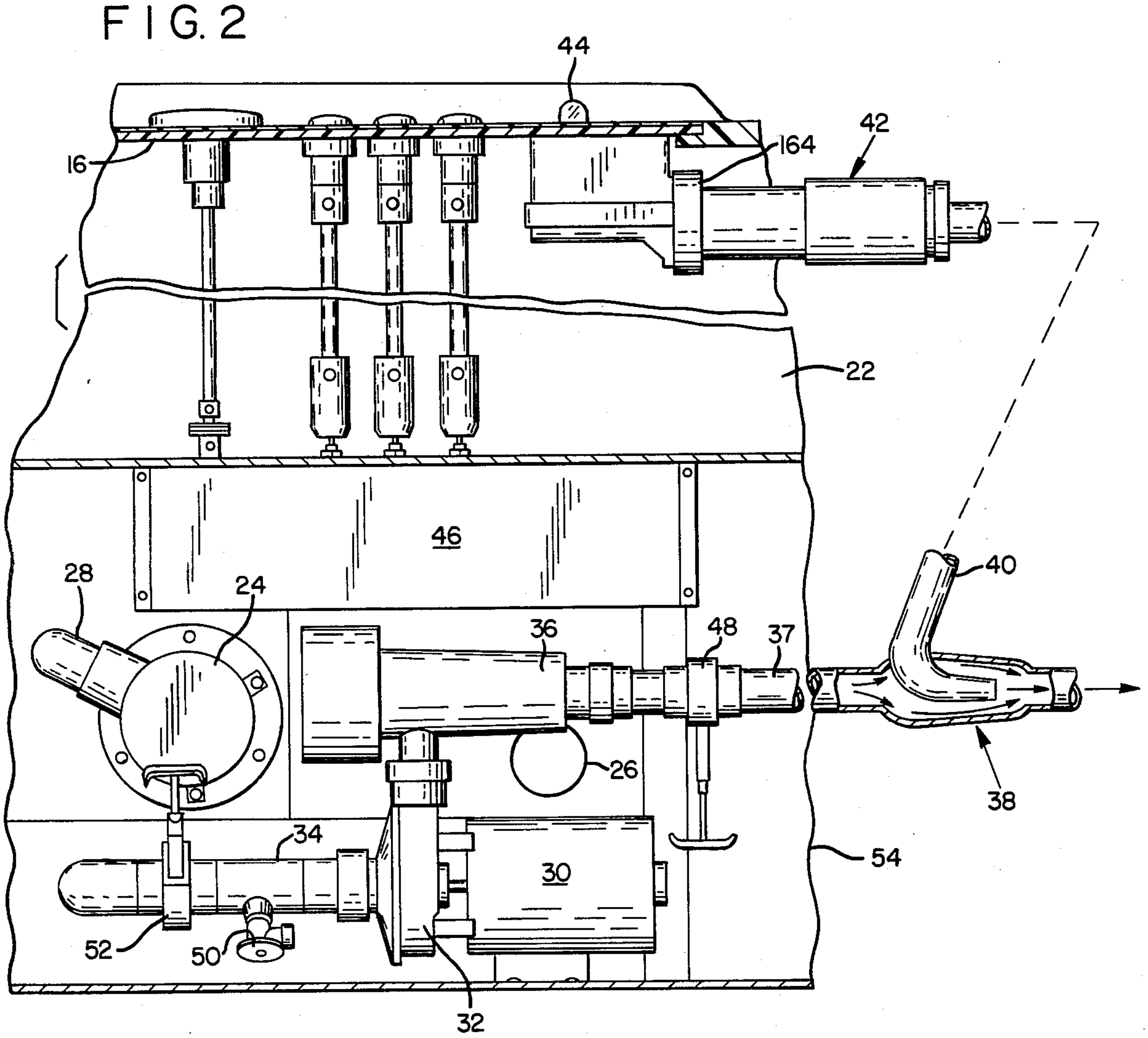
FIG. 2 is a view taken generally along the line 2—2 in FIG. 1, and on a slightly larger scale, illustrating portions of the control panel and also portions of an equipment chamber which is provided in the spa beneath the control panel.

The usual spa includes a number of power-operated devices which are selectively controlled to produce different functions effecting the operating conditions of the spa. By way of example, and as discussed in connection with the spa particularly disclosed herein, the spa may include a blower and motor driving it, which are operated to produce injection of air through apertures in the spa forming streams of bubbles in the spa water, a function herein referred to generally as airation. Other devices may comprise a pump which circulates water in the spa, a thermostat-controlled heater for heating the water of the spa, and an underwater spa light to illuminate the spa as when the spa is used at night. All of these devices are commonly energized with the use of electricity:

In the spa herein particularly disclosed, and referring to FIG. 2, adjacent the side of the spa and below control panel 20 is an equipment partially shown at 22. This equipment chamber houses a blower assembly 24, which includes an electric motor and fan and which functions when operating to draw air from within the equipment chamber and through a duct 26 to an inlet for the blower assembly (not shown) and to exhaust such air through a duct 28 whence such air is delivered to spaced apertures in the side of the tub with airation bubbles then forming.

Water is circulated in the spa through operation of an assembly including a motor 30 connected to a pump 32. The intake to the pump is via duct 34 which communicates with the tub portion of the spa. Water pumped is discharged from an outlet or discharge of the pump through a heater 36, a duct or conduit 37, and a venturi-type air mixing device 38, thence to be delivered through a hydro jet (not shown) to the interior of the tub portion in the spa. Air is delivered to mixer 38 via a conduit 40 which connects through a slide valve mechanism 42 to the atmosphere. The opening of this slide valve mechanism is controlled by a knob 44. Advancement of knob 44 to the right in FIG. 2 serves to close off the supply of air to duct or conduit 40, and movement in the opposite direction serves to open up the air flow into the conduit.

In FIG. 1, shown beside knob 44 is another knob 45 similar in construction to knob 44. In a spa, it may be desirable to have more than one hydro jet supplied with airated circulated water utilizing another mixer such as the one shown at 38 suitably connected to the discharge of pump 32 whereby such is supplied with heated circulated water together with mixer 38 shown. Knob 45 may be utilized in the controlling of the admission of air to such a mixer. The slide valve controlled by knob 45 and associated structure, such as the mixer which the valve controls, have been eliminated from the drawings for reasons of simplicity, as a full description of the mechanism controlled by knob 45 would be duplicative of the description hereinafter following of valve 42 and the mixer which receives air from this valve.

Shown within the equipment chamber located below the heater and blower assembly is a control box 46 which contains switches and circuitry operable to control actuation of blower assembly motor 30, pump 32, heater 36, and lighting for the spa. Details of such circuitry are not considered necessary for an understanding of the present invention. Further illustrated in FIG. 2, and part of the equipment within the equipment chamber, is a shut off valve 48 adjustable to open and close duct 37, a hose bib 50, including a valve and a connector for a hose through which water may introduced into conduit or duct 34, and a shut off valve 52 for opening and closing conduit 34.

The equipment chamber includes wall structure 54 defining the extent of the chamber and joining with wall structure in the spa forming the tub portion of the spa and rim 14. The wall structure forms an essentially watertight compartment for the equipment described with this compartment being closed off at the top thereof by control panel 20.

Figure 3:
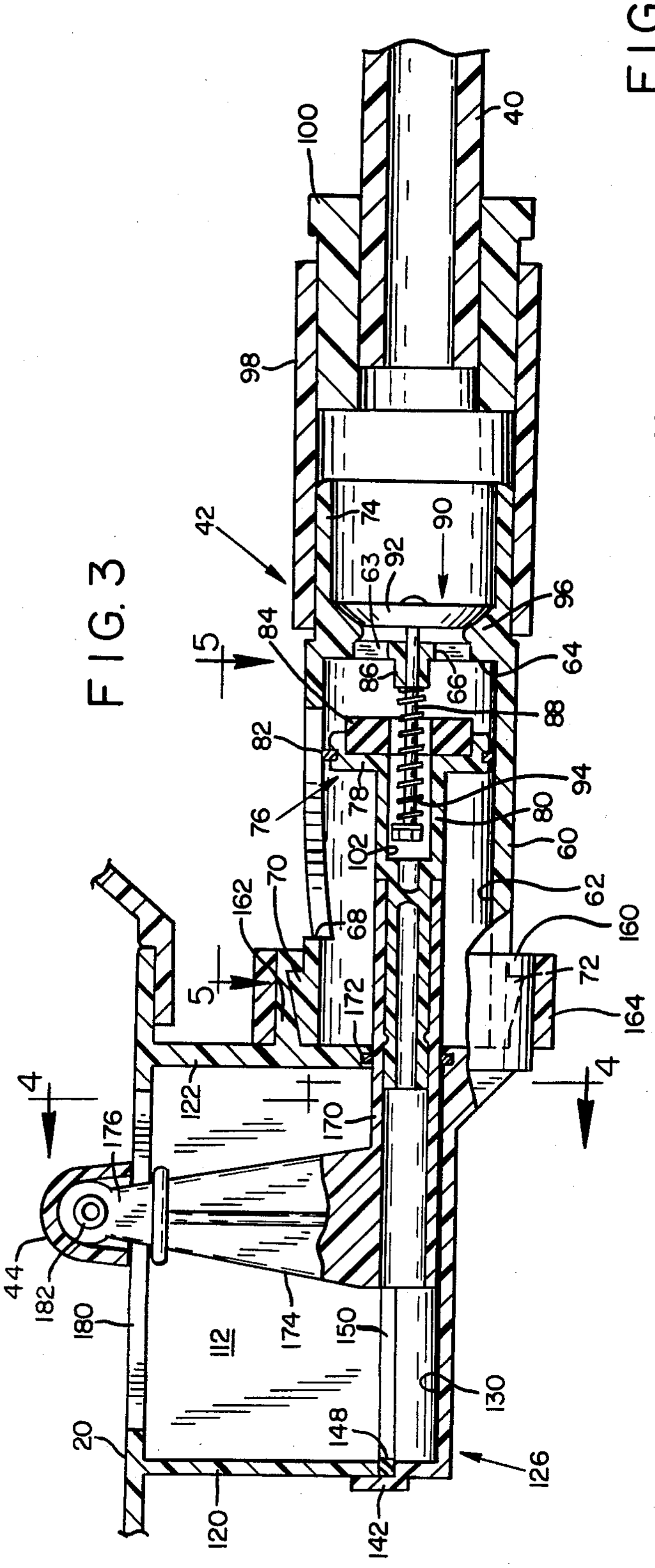
Figure 4:
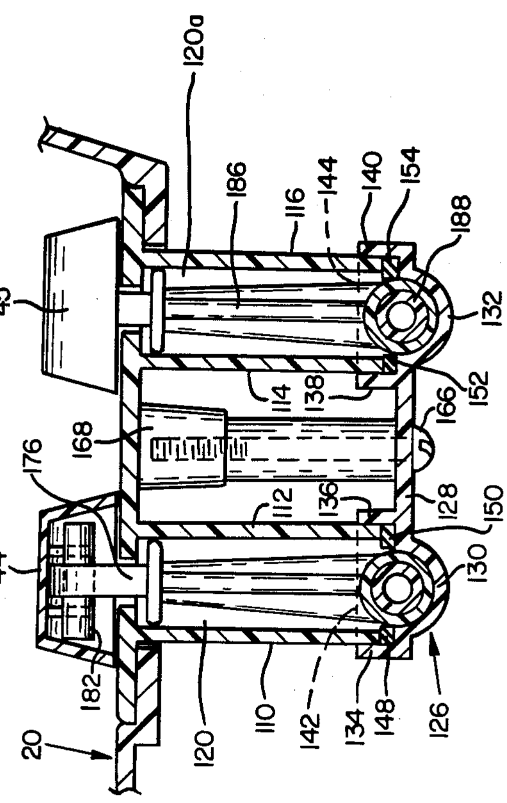
FIG. 4 is a view taken generally along the line 4—4 in FIG. 3.
Figure 5:
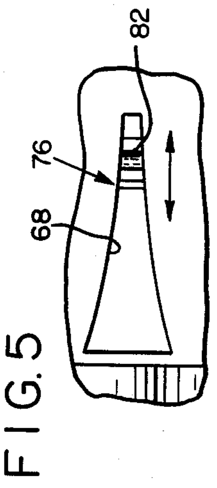
FIG. 5 is a view looking downwardly at portions of the valve housing in the slide valve, viewing the side of the housing from along the line 5—5 shown in FIG. 3.

Considering now details of the construction of slide valve 42, and referring to FIGS. 3, 4, and 5, shown at 60 is an elongate, substantially cylindrical valve housing, which has an axially extending elongate cylindrical valve chamber 62 circumscribed by the wall of the housing. One end of this chamber is formed by an end wall 64 containing apertures 63 extending therethrough.

Extending along the length of the valve housing, along the top as viewed in FIG. 3, is an elongate air admission slot or opening 68 connecting the interior of the chamber with the atmosphere. Preferably, such has a tapered, and thus a gradually increasing width, extending from the end of the slot which is adjacent end wall 64.

On the outside of the valve housing and adjacent its left end as viewed in FIG. 3, are flaring shoulder projections 70, 72 utilized in mounting the valve housing in place. The opposite end of the valve housing has, as an integral part thereof, a cylindrical skirt 74 extending toward the right of end wall 64.

Slidably mounted for movement within chamber 62 is a valve closure element 76. The closure element takes the form of a circular disc 78 joined to a stem 80. An O-ring 82 seats within an angular groove extending about the perimeter of the disc and seals the closure element to the inside of chamber 62. The closure element may have a recessed front face receiving an annular elastomeric washer 84.

End wall 64, on the left side thereof, is formed with a boss 86. Extending through the boss is a cylindrical passage receiving the stem 88 of a check valve 90. The check valve includes an elastomer disc or closure member 92 suitably secured to stem 88. A coil spring 94 interposed between boss 86 and the remote end of stem 88 biases the check valve to the left or to a closed position, where disc 92 seats against valve seat portion 96 formed integral with skirt 74.

The valve housing is suitably joined to conduit 40 by way of a coupler 98 mounted on and secured to skirt 74. A bushing 100 fitted about the conduit 40 fits snugly within the opposite end of coupler 98.

Stem 80 of the valve closure element has an axially extending passage 102 which receives stem 88 and encircling spring 94 of the check valve.

The slide valve is supported on the underside of control panel 20 through plunger housing structure including first and second sets of vertical parallel walls formed as an integral part of the control panel, the walls of one set being indicated at 110 and 112 in FIG. 4 and the walls of the other set at 114 and 116. Disposed normal to walls 110, 112, and spanning end margins of walls 110, 112, are vertical wall segments 120, 122. Walls 110, 112 and wall segments 120, 122 form a narrow, box-like enclosure depending from the central panel. Wall segments similar to wall segments 120, 122, including wall segment **120*a* shown in FIG. 4, join with end margins of walls 114, 116** to form another similar box-like enclosure depending from the central panel.

Closing off the base of the box-like enclosures just described is what is referred to herein as a bottom cap 126. Such includes a floor portion made up of flat expanse 128 and semicylindrical trough portions 130, 132 formed integrally with flat expanse 128. Also part of the bottom cap are flanges 134, 136, 138, and 140 which, with the bottom cap assembled and in place, fit snugly against the bottom margins of vertical walls 110, 112, 114, 116, respectively. Flanges 134, 136 are joined by a flange 142, and flanges 138, 140 are joined by a flange 144. With the bottom cap in place, trough portion 130 forms the base of the box-like enclosure formed by wall segments 120, 122 and walls 110, 112. Trough portion 132 forms the base of the box-like enclosure formed by walls 114, 116.

Providing a seal extending between the bottom cap and the various vertical walls is sealing means including seal expanses shown at 148, 150, 152, 154.

Formed as an integral part of the bottom cap adjacent through portion 130 is a semicylindrical seat portion 160 and formed as an integral part of wall segment 122 is a semicylindrical seat portion 162. These oppose and complement each other with the bottom cap in place, to provide a sleeve encircling the left end of the valve housing in the slide valve. Internal regions of the seat portions may be recessed to receive, in locked fashion, shoulder projection 70, 72 earlier described. A clamp 164 may be provided encircling the seat portions and serving to hold them securely about the end of the valve housing which is received within the seat portions.

Similar seat portions (not shown) are provided in conjunction with trough portion 132.

Securing the bottom cap to the plunger housing structure of the control panel are fasteners such as fastener 166 which extend up through flat expanse 128 to be received within an internally threaded boss 168 which is part of the control panel.

Considering how a slide valve is actuated, stem 80 of the valve closure element extends into and is secured within a sleeve 170, the sleeve and stem thereby effectively forming a plunger extending axially to the left of the valve closure element. Such plunger is slidably mounted in trough portion 130 and guided for movement by the trough portion. An O-ring 172 provides a seal sealing the exterior of the plunger where such extends into the housing structure. Integrally formed with sleeve 170 is a post 174. The post terminates in an upper web portion 176 which extends through slot 180 in control panel 20. A pin 82 inserted through an accommodating bore extending transversely of web portion 176 provides a mounting for knob 44 earlier described.

Knob 45 is similarly mounted on the upper end of a post 186 joined to a plunger structure 188 which slides in trough portion 132. As already explained, the slide valve controlled by this plunger has not been illustrated, such being substantially identical to the slide valve already described.

In operation and with the motor 30 operating to drive pump 132, water is circulated with return of the circulated water to the tub portion of the spa through conduit 37. Movement of circulated water through a venturi-type action in mixer 38 produces a subatmospheric pressure in conduit 40. With valve closure element 76 positioned fully to the right as such is viewed in FIG. 3, washer 84 comes up against the apertures in wall 64 to close them off and 0-ring 82 is located beyond the end of slot 68. Under these conditions, no air is admitted to the mixer 38.

With movement of the valve closure element 76 to the left, for instance to the position shown for the closure element in FIG. 5, a portion of slot 68 is placed in communication with the right end of chamber 62. With water circulated through mixer 38 by operation of the pump, the vacuum produced in conduit 40 functions to draw air inwardly through this portion of the slot and thence past the check valve with such air flowing into conduit 40. With the closure element shifted still farther to the left, a greater extent of slot 68 opens to the right end of the chamber, thus affording a greater flow rate of air into the conduit 40. It is important that this slot have the flaring outline illustrated in FIG. 5 as such tends to produce a more uniform change in the amount of air introduced for a predetermined amount of displacement in the closure element. Further explaining, with only a small extent of the slot opened up to the right end of chamber 62 in FIG. 3, a relatively high pressure differential exists across the slot producing a relatively large flow of air in proportion to the extent of the slot that is open. As the extent of the slot which is open to the right end of chamber 62 increases, the pressure differential across the slot becomes less, which would result, and where the slot made of uniform width, in a less noticeable change of air introduction for a given displacement of the closure element with the closure element occupying a more open position than when it is almost closed. The flaring construction for the slot overcomes this tendency.

The construction contemplated permits a relatively simple construction for linking movement of a slidable actuator or knob, such as knob 44, with a valve controlling air admission to mixer 38. The actuator or knob is a direct extension of the plunger which is shifted axially to produce displacement of the valve closure element.

The valve components for the most part are relatively easily fabricated from a plastic, such as polyvinyl chloride. Assembly of the slide valve and the actuator system for the closure element in the valve is readily performed. Maintenance is minimal and repairs are readily performed when necessary.

With the admission of air through the slide valve being through a slot located within the equipment chamber of the spa, heated air produced by heat generated by the electrically operated instrumentalities housed within the equipment chamber is the air which is introduced for mixture with the circulated water.

While a particular and preferred embodiment of the invention has been described, it is obvious that variations and modifications are possible without departing from the invention. Included with this invention, therefore, are all such modifications and variations which fall within the scope of the invention.

It is claimed and desired to secure by Letters Patent:

1. In a spa, which includes a tub portion for holding a volume of water receiving the occupant of the spa, and power-operated pump means having an intake and discharge for circulating water in the tub:

a return conduit connecting the discharge of the pump and said tub;

an air conduit connecting with said return conduit for supplying air to water flowing through said return conduit; and a slide valve controlling air flow into said air conduit, said slide valve including an elongate chamber circumscribed by a housing wall extending the length of the chamber, an air intake opening extending along the length of the chamber, a valve closure element movable along the length of the chamber operable to vary the extent of the opening communicating with one end of the chamber, and a passage connecting said one end of the chamber with said air conduit.

2. The spa of claim 1, wherein said air intake opening has increasing width progressing in a direction away from said one end of the chamber.

3. In a spa which includes a tub portion for holding a volume of water, and power-operated pump means for circulating water in the tub portion, said pump means having a discharge:

a return conduit connecting said discharge with said tub portion and an air conduit connecting with said return conduit for supplying air to water flowing through said return conduit; and a slide valve controlling air flow in said air conduit;

said slide valve including a housing wall defining and elongate cylindrical chamber, a valve closure element slidable along the length of said chamber, an elongate air admission slot formed in said wall opening to said chamber, movement of the closure element along the chamber varying the extent of said slot which connects with one end of the chamber, and a passage connecting said one end of the chamber and said air conduit.

4. The spa of claim 3, which includes a control panel for the spa having an exterior side accessible to the spa user, a control knob for the valve exposed on said exterior side and mounted for movement in a linear path along said panel, and means connecting said knob and said closure element whereby movement of the knob produces movement of the closure element.

5. The spa of claim 3, which further comprises a check valve in said passage responsive to a subatmospheric pressure in said air conduit to open said passage.

6. The spa of claim 4, wherein said means connecting the closure means and said knob comprises a plunger connected to the closure means extending out from the end of said chamber opposite said chamber's one end and, mounted for reciprocal movement in said housing, and means connecting said knob and plunger.

7. The spa of claim 6, wherein said valve housing is located on the opposite side of said panel from said exterior side, and said means connecting said housing and plunger comprises a post extending radially of said plunger to adjacent said panel.

8. The spa of claim 6, which further includes an equipment chamber and electrically-operated means in said chamber producing operating functions for the spa, said opposite side of said panel facing the interior of said equipment chamber, and said admission slot opens to the interior of said equipment chamber.

* * * * *